United States Patent [19]

Palmateer, Jr et al.

[11] Patent Number: 5,310,295
[45] Date of Patent: May 10, 1994

[54] TOOL FEEDING METHOD IN GEAR MANUFACTURING PROCESSES

[75] Inventors: Donald W. Palmateer, Jr, Rochester; Mark J. Bogh, East Rochester; Theodore J. Krenzer, West Rush, all of N.Y.

[73] Assignee: The Gleason Works, Rochester, N.Y.

[21] Appl. No.: 34,053

[22] Filed: Mar. 22, 1993

[51] Int. Cl.$^5$ ............................................... B23F 9/14
[52] U.S. Cl. ....................................... 409/13; 51/287; 409/26
[58] Field of Search ................ 409/12, 13, 26, 51, 409/28, 29; 51/287

[56] References Cited

U.S. PATENT DOCUMENTS

| | | | |
|---|---|---|---|
| 2,773,429 | 12/1956 | Wildhaber | 409/13 |
| 4,981,402 | 1/1991 | Krenzer et al. | 409/26 |
| 5,116,173 | 5/1992 | Goldrich | 409/13 |

OTHER PUBLICATIONS

Goldrich, Robert N., "CNC Generation of Spiral Bevel and Hypoid Gears: Theory and Practice", The Gleason Works, Rochester, New York, USA, 1990.

*Primary Examiner*—William Briggs
*Attorney, Agent, or Firm*—Robert L. McDowell; Ralph E. Harper

[57] ABSTRACT

Disclosed herein is a process for feeding a tool relative to a workpiece in a machining process such as a process for forming bevel and hypoid gears. The method comprises feeding the tool from an initial contact position with the workpiece to a full depth position in the workpiece along a feedpath at least a portion of which is defined by a feed vector having at least two feed vector components lying in an axial plane. The first feed vector component being substantially in the direction of the axis of a theoretical generating gear and the second feed vector component being substantially in a direction perpendicular to the generating gear axis. The feed vector may include a third feed vector component lying in a normal plane. With this feedpath undesirable tool shifting and workpiece spiral angle changes are significantly reduced.

15 Claims, 5 Drawing Sheets

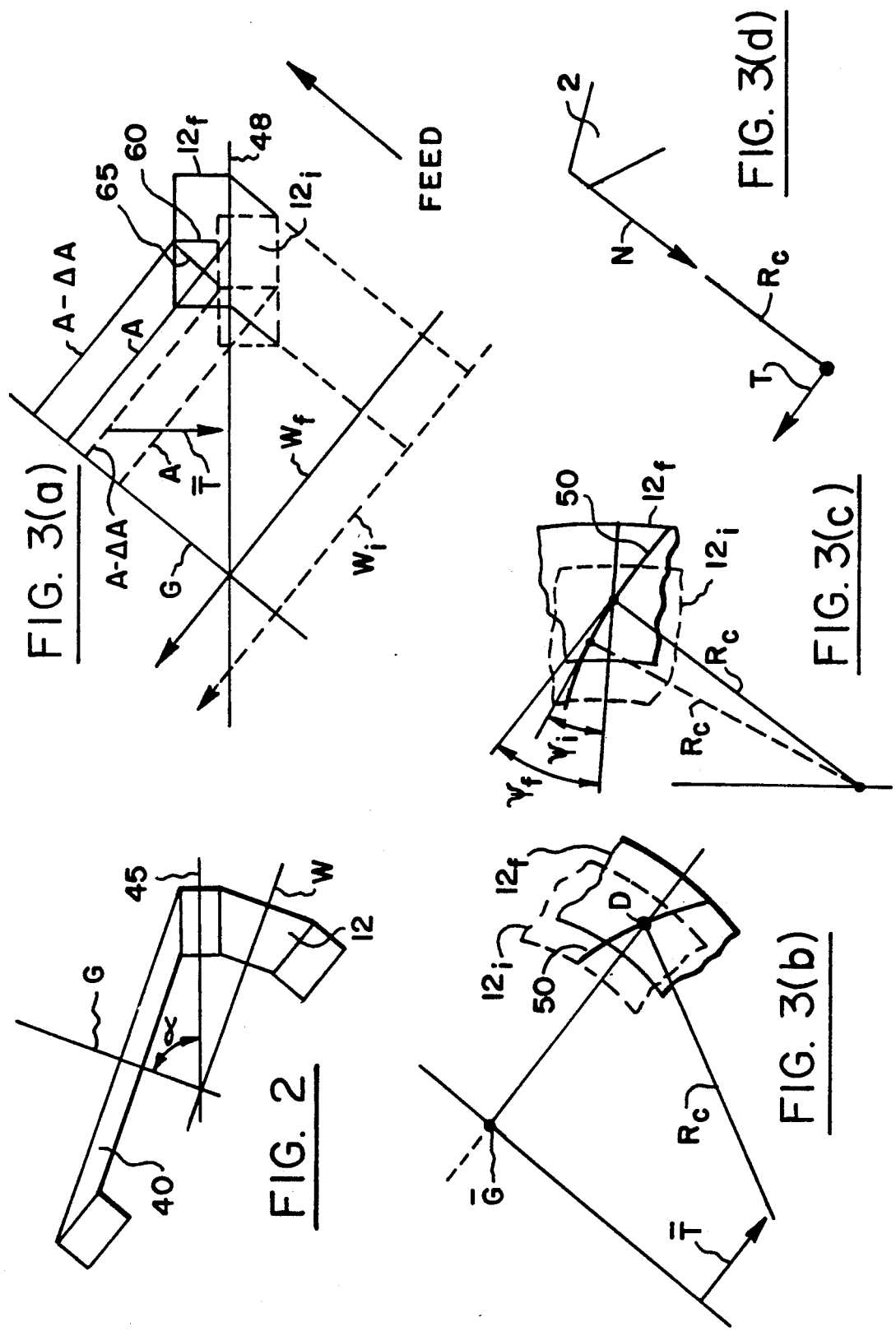

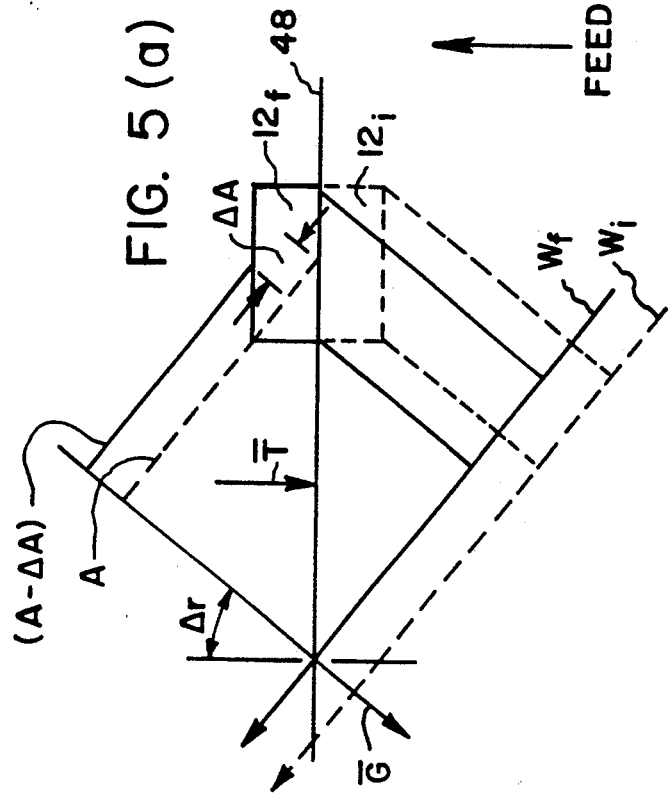
FIG. 5(a)
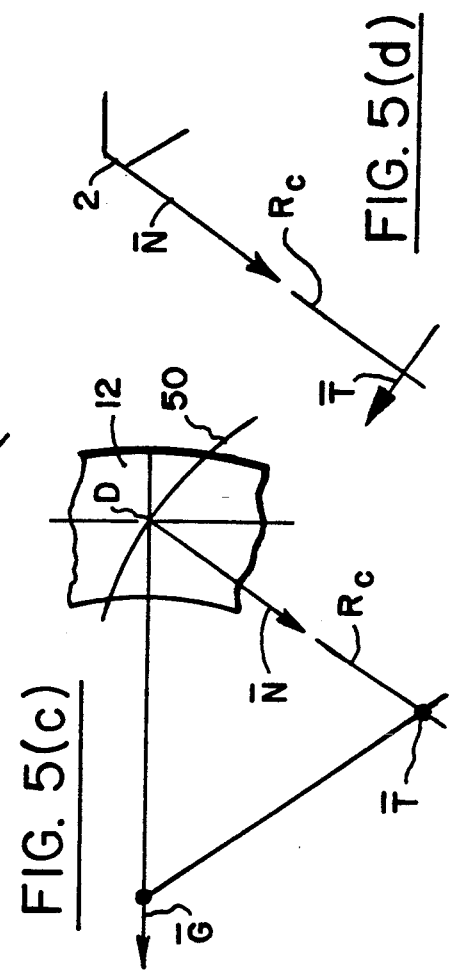
FIG. 5(d)
FIG. 5(c)
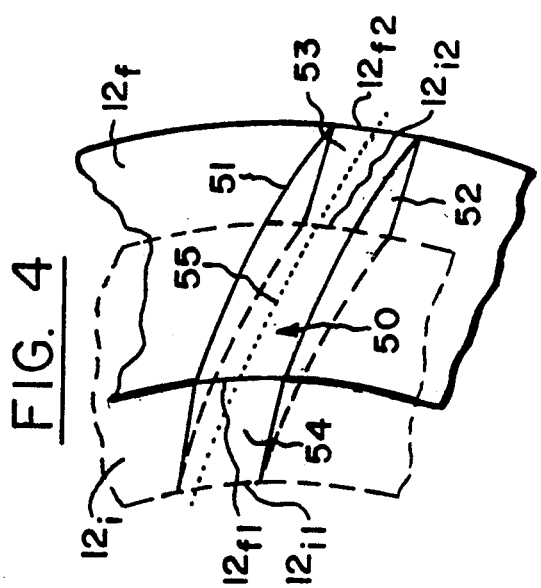
FIG. 4
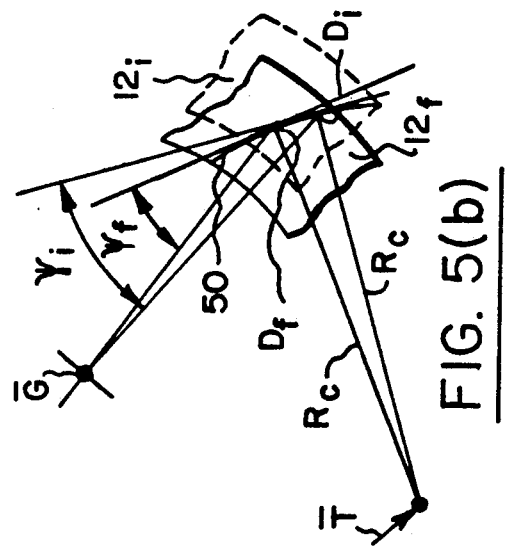
FIG. 5(b)

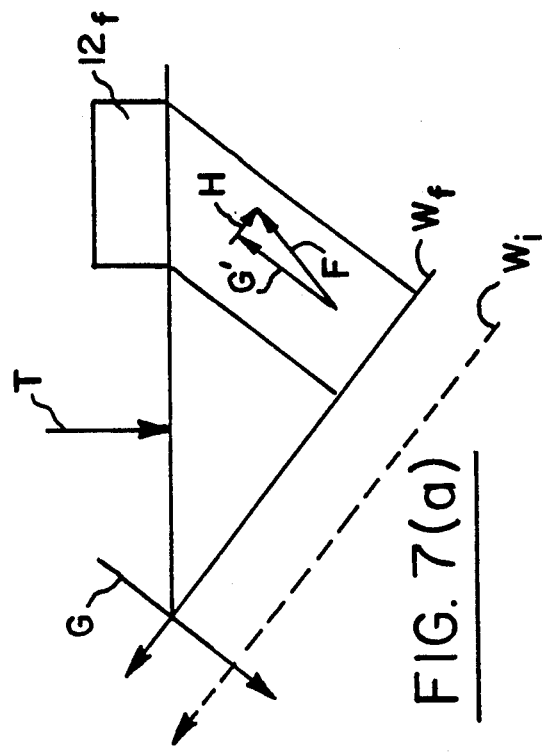
FIG. 6
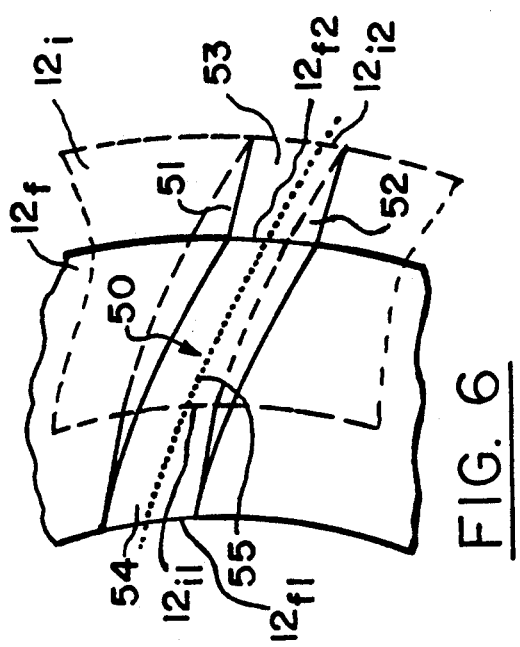
FIG. 7(a)
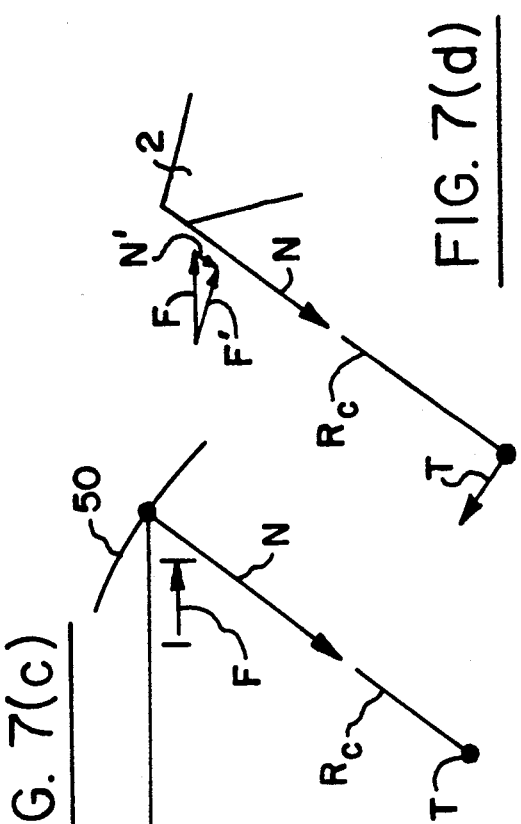
FIG. 7(c)
FIG. 7(d)
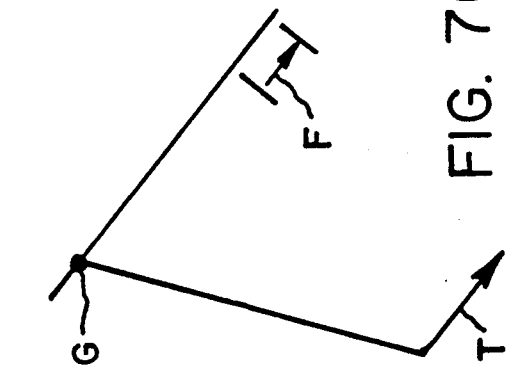
FIG. 7(b)

TOOL FEEDING METHOD IN GEAR MANUFACTURING PROCESSES

FIELD OF THE INVENTION

The present invention relates to the formation of bevel gears and the like. Particularly, the present invention is directed to a method of feeding a tool to a predetermined depth in a workpiece wherein the path of feeding is controlled.

BACKGROUND OF THE INVENTION

In the production of bevel and hypoid gears, two types of processes are commonly employed, generating processes and non-generating processes.

In generating processes a rotating tool is fed into the workpiece to a predetermined depth. Once this depth is reached, the tool and workpiece are then rolled together in a predetermined relative rolling motion, known as the generating roll, about the axis of a theoretical generating gear as though the workpiece were rotating in mesh with the theoretical generating gear, the teeth of the theoretical generating gear being represented by the stock removing surfaces of the tool. The profile shape of the tooth is formed by relative motion of the tool and workpiece during the generating roll.

Generating processes can be divided into two categories, face milling and face hobbing. In generating face milling, each slot (adjacent tooth sides of consecutive teeth) of a workpiece is formed individually. After the tool has been fed to its predetermined depth, the generating roll is commenced.

In the generating roll, tooth surfaces may be formed by any of several known cycles. One tooth surface of a slot may formed by a forward generating roll and the adjacent tooth surface formed by a generating roll in the reverse direction. Alternatively, both sides of the tooth slot may be cut in a single forward generating roll and if a secondary or finishing cut is required, this may be accomplished by a reverse roll to produce the desired tooth surfaces. Once the tooth sides are completed, the tool is withdrawn relative to the workpiece and the workpiece is then indexed to the next slot position. This intermittent indexing is continued until all tooth surfaces on the workpiece are formed.

Generating face hobbing is a continuous indexing process wherein a predetermined timed rotation between the tool and workpiece is superimposed on the generating roll. In this manner, all slots (and therefore all tooth surfaces) on the workpiece are formed by a single generating roll. The tool and workpiece are rotated in a timed relationship and the tool is then fed into the workpiece thus removing stock from all slots as it is fed to depth. Once full depth is reached, the desired generating cycle is commenced to completely form all teeth on the workpiece.

Non-generating processes, either intermittent indexing or continuous indexing, are those in which the profile shape of a tooth on a workpiece is produced directly from the profile shape on the tool. The tool is fed into the workpiece and the profile shape on the tool is imparted to the workpiece. While no generating roll is employed, the concept of a theoretical generating gear known as a "crown gear" is applicable in non-generating processes. The crown gear is that theoretical gear whose tooth surfaces are complementary with the tooth surfaces of the workpiece. Therefore, the cutting blades on the tool represent the teeth of the crown gear when forming the tooth surfaces on the non-generated workpiece.

In non-generating and generating processes, the first step is to engage the cutting or grinding tool with the workpiece and then feed the tool to the predetermined depth in the workpiece. The tool may be moved toward the workpiece, the workpiece may be moved toward the tool, or, both the tool and workpiece may be moved toward one another. Regardless of which of the tool and/or workpiece is moved, the tool must reach its predetermined plunge depth in the workpiece before the stock removal is complete and the tool withdrawn (non-generating processes) or the generating roll is commenced (generating processes).

The path along which the tool travels from its initial contact with the workpiece to its predetermined or "full" depth may vary. As discussed by Goldrich in "CNC Generation Of Spiral Bevel and Hypoid Gears: Theory and Practice", The Gleason Works, Rochester, N.Y., 1990, in conventional mechanical gear cutting and/or grinding machines comprising a cradle, which emulates the theoretical generating gear, the feedpath is in a direction along the cradle (generating gear) axis. While this type of tool feeding is well established, uneven tool loads or stresses have been noted.

The same Goldrich publication also discloses a CNC multi-axis gear generating machine wherein the feedpath of a tool into a workpiece may be in a direction along the tool axis. In feeding along the tool axis, the feedpath lies in a plane defined by the tool axis and a tooth normal vector at the design point (the point around which the geometry of the tooth is calculated). This plane is referred to as the "normal plane". The design point is usually the mean point of the tooth, the mean point being a point midway root-to-top and toe-to-heel on the tooth. This type of feeding is advantageous in cases where tool entrapment may occur when the feedpath is along the cradle axis. Tool entrapment is the condition whereby the tool removes excess stock material due to its particular presentation and motion relative to the workpiece. Feeding along the tool axis presents the tool to the workpiece in a manner that tool entrapment is prevented. However, feeding along the tool axis has exhibited excessive uneven tool loads especially in generating face hobbing processes.

Goldrich further discloses that feeding of the tool may take place at an angle relative to the tool axis in order to balance chip loads for cutting blades having unequal pressure angles. When cutting tools having unequal pressure angles are utilized, one side of the blades may remove more stock material than the other side thus causing one set of blades to wear faster than the other set of blades. When feeding a tool along the tool axis, the condition of uneven tool loads is further aggravated by utilizing tools having such unequal pressure angles. In this situation, the feedpath may be changed to an angle relative to the tool axis, but, the feedpath remains within the normal plane. This angled feedpath within the normal plane allows the tool to contact the workpiece in a manner such that stock removal between the two sides of the tool is balanced and blade wear due to unequal stock removal is alleviated. However, it should be noted that while feeding in the normal plane at an angle relative to the tool axis may reduce the wear and vibrational problems associated with unequal tool pressure angles, this type of tool feeding has not been found to remedy the excessive and uneven tool loads associated with feeding along the tool axis especially in generating face hobbing processes as noted above.

It is an object of the present invention to provide a method of feeding a tool relative to a workpiece wherein uneven tool loads associated with prior art feedpaths are reduced or eliminated.

SUMMARY OF THE INVENTION

The present invention comprises a method of feeding a tool to a predetermined depth in a workpiece in a machining process for producing at least one tooth surface on the workpiece such as a bevel gear. The tool is rotatable about a tool axis and has at least one stock removing surface. The workpiece is rotatable about a work axis and is in mesh with a theoretical generating gear which is rotatable about a generating gear axis. The method comprises contacting the tool and the workpiece and feeding the tool relative to the workpiece along a feedpath to the predetermined depth.

The method includes at least a portion of the feedpath being defined by a feed vector comprising at least first and second feed vector components. The feed vector components are positioned in an axial plane defined by the generating gear axis and the work axis. The first feed vector component being in substantially the direction of the generating gear axis and the second feed vector component being substantially perpendicular to the generating gear axis.

The feed vector may further include a third feed vector component. The third feed vector component being in a normal plane with the normal plane being defined by the tool axis and a normal vector to the design point of a tooth.

The method of feeding a tool relative to a work gear in the present invention is preferably carried out on a computer controlled machine. The computer controlled machine comprising a plurality of computer controlled axes for positioning and operatively engaging the tool with the work gear.

In performing the inventive method on a computer controlled machine, initial axes setup positions are calculated in response to setup parameters input to the machine. The computer controlled axes are then moved to the initial setup positions for initially positioning the tool and work gear with respect to each other. A feedpath of said tool relative to said work gear is calculated in response to feed parameters input to the machine. The tool is then rotated about the tool axis and the computer controlled axes are moved to feed the rotating tool relative to the work gear along the feedpath to a predetermined depth in the work gear. At least a portion of the feedpath is defined by a feed vector comprising at least first and second feed vector components as defined above.

BRIEF DESCRIPTION OF THE DRAWINGS

FIG. 2 depicts a tapered theoretical generating gear in mesh with a workpiece.

FIGS. 3a, 3b, 3c, and, 3d illustrate a feedpath in the direction of the theoretical generating gear axis as viewed respectively in an axial plane, along the generating gear axis, in the pitch plane, and, in the normal plane.

FIG. 4 shows the position change from initial contact to final depth of a tool in a tooth slot when the feedpath is in the direction of the theoretical generating gear axis.

FIGS. 5a, 5b, 5c, and 5d illustrate, respectively, a feedpath in the direction of the tool axis respectively in an axial plane, along the generating gear axis, in the pitch plane, and in the normal plane.

FIG. 6 shows the position change from initial contact to final depth of a tool in a tooth slot when the feedpath is in the direction of the tool axis.

FIG. 7a, 7b, 7c, and 7d illustrate a feedpath according to the present invention as viewed respectively in an axial plane, along the generating gear axis, in the pitch plane, and, in the normal plane.

DETAILED DESCRIPTION OF THE PREFERRED EMBODIMENTS

The details of the invention will now be discussed with reference to preferred embodiments and the accompanying Drawings.

It is preferred that the process of the present invention be carried out on machines such as that disclosed in U.S. Pat. No. 4,981,402 the disclosure of which is hereby incorporated by reference. This machine is of the type generally known as computer numerically controlled, or CNC, machines which comprise a plurality of axes along which movement of a grinding or cutting tool and a workpiece can be controlled in order to orient the tool and workpiece relative to one another in almost any position within the operational limits of the machine.

CNC machines for controlling movement of multiple machine axes along prescribed paths are now commonplace. Such state-of-the-art systems are incorporated in the present invention to control movements of selected axes along prescribed paths for orienting a tool with respect to a workpiece, specifically a work gear.

Figure 1:
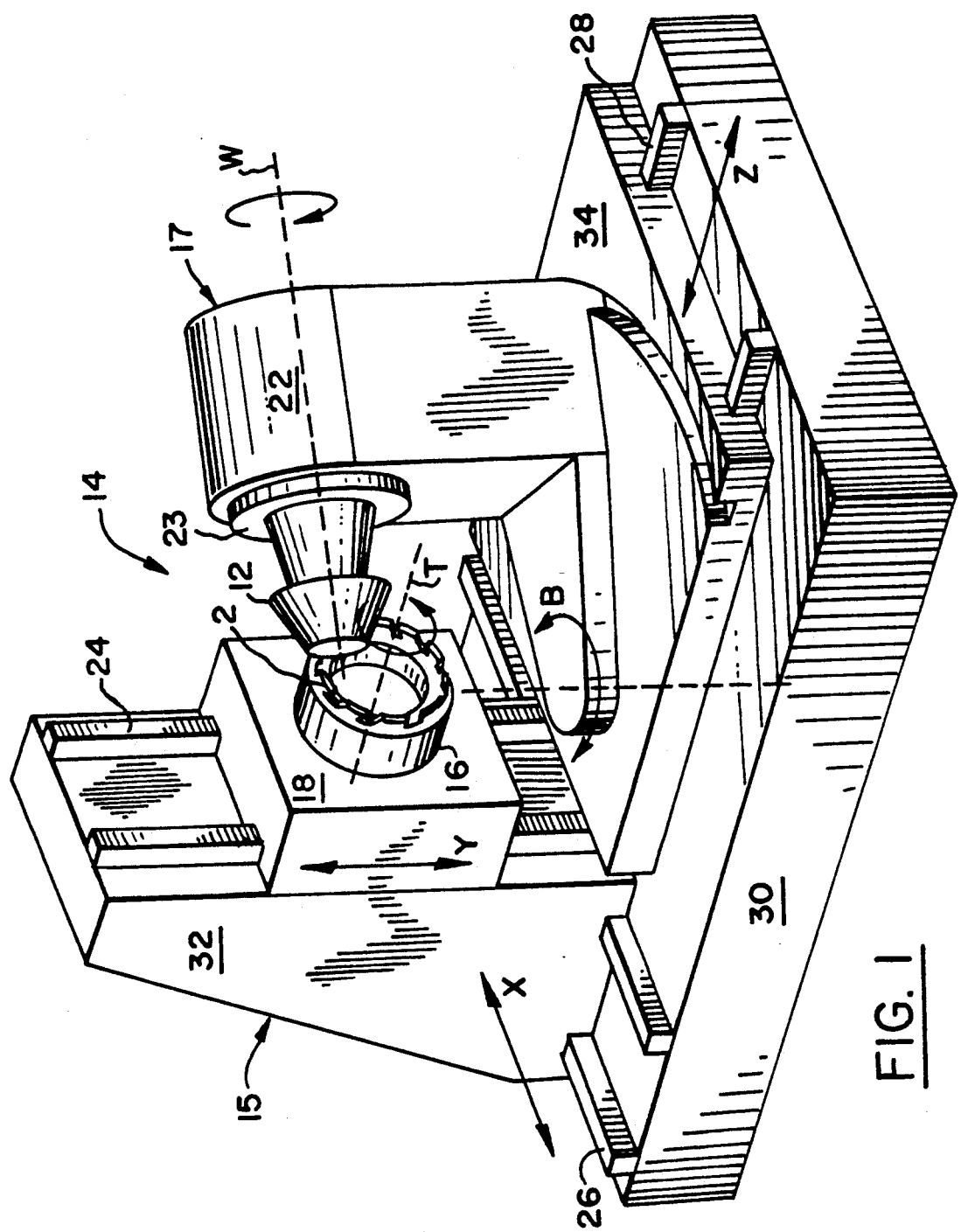
FIG. 1 is a schematic illustration of a computer controlled machine for carrying out the present inventive method.

A machine similar to previously mentioned U.S. Pat. No. 4,981,402 is shown in FIG. 1. The apparatus 14 comprises a tool support 15 for a tool 2 such as the illustrated cutting tool. The tool 2 is releasably mounted to a tool spindle 16 which in turn is journaled for rotation in a tool head 18. Tool head 18 is capable of vertical movement (Y-axis) along ways 24 attached to carriage 32. Tool support 15 is capable of horizontal movement (X-axis) along ways 26 attached to machine base 30. Tool 2 is capable of rotary movement about its rotational axis T.

Apparatus 14 also comprises work support 17 wherein work gear 12 is releasably mounted to work spindle 23. Work spindle 23 is journaled for rotation in work head 22 and is capable of rotary movement about a longitudinal work axis W. Work head 22 is mounted onto table 34 and is capable of angular (pivotal) movement about vertical axis B. Table 34 is capable of horizontal movement (Z-axis) along ways 28 attached to machine base 30.

Ways 24, 26 and 28 permit relative linear movement of the tool 2 and work gear 12 in three mutually orthogonal directions X, Y, and Z.

Movement of tool spindle 16, work spindle 23, work head 22, table 34, tool head 18 and carriage 32 is imparted by separate drive motors (not shown). The above-named components are capable of independent movement with respect to one another and may move simultaneously with one another. Each of the respective motors is associated with either a linear or rotary encoder (not shown) as part of a CNC system which governs the operation of drive motors in accordance with input instructions input to a computer (not shown). The encoders provide feedback information to the computer concerning the actual positions of each of the movable axes.

It can be clearly seen that by relative movement of the tool 2 and work gear 12 along any or all axes it is possible to orient the tool 2 and work gear 12 with respect to one another so that any area of the work gear 12 may be presented to the tool 2. Once presented, feed movement of the tool 2 and/or the work gear 12 is effected to cause the tool 2 to contact the work gear and plunge to a predetermined depth.

Once the predetermined depth of plunge has been attained, a generating motion may be carried out. In the generating motion, the work gear and tool roll together about the axis of a theoretical generating gear as though the work gear were rolling in mesh with the theoretical generating gear whose tooth surfaces are represented by the stock removing surfaces of the tool. The tool path during generation is directed by the computer, in response to input instructions, to control movements along respective axes in order to produce a desired tooth surface geometry.

FIG. 2 represents a theoretical generating gear 40 in mesh with a workpiece 12 which in this instance is the pinion member of a gear set. The generating gear 40 includes an axis of rotation G and the rotational axis of the workpiece 12 is designated by W. The pitch line of workpiece 12 and theoretical generating gear 40 is shown at 45. The angle α between the generating gear axis G and the pitch line 45 is known as the pitch angle. Generating gear axis G and workpiece axis W together define an "axial plane".

In non-generating processes, the pitch angle α equals 90 degrees and in this instance the theoretical gear 40 would take the form of a crown gear. However in generating processes, as is the case in FIG. 2, generating gear 40 can be a "tapered" generating gear which deviates from the crown gear by having a pitch angle less than 90 degrees.

The compliment of the pitch angle α of the theoretical generating gear 40 is referred to as generating pitch angle tilt and is the amount which the axis of the theoretical generating gear is tilted relative to the generating gear axis G. Since the teeth of the theoretical generating gear are represented by the stock removing surfaces of the tool in the generating process, proper presentation of the tool to the workpiece includes adjusting the work axis W in the machine setup. The amount of generating pitch angle tilt is generally defined as ninety degrees (90°) minus the pitch angle of the generating gear. Of course, any desired mismatch to be introduced in the workpiece may also affect the amount of generating patch angle tilt. In many instances, one member of a gear set is formed by a non-generating process and the mating member is generated. With reference to the generating arrangement of FIG. 2, pitch angle α would equal 90 degrees minus the pitch angle of the non-generated mating member.

FIGS. 3a, 3b, 3c, 3d represent views of a workpiece in an axial plane, along the generating gear axis, in the pitch plane, and in the normal plane, respectively, when the workpiece is fed relative to the tool in a direction along the generating gear axis G. In all drawing Figures, the position of the workpiece at the initial instance of contact with the tool is shown by dashed lines and the position of the workpiece at the full depth position is shown by solid lines.

It should be noted that with respect to the tool, the terms inside blades and outside blades are used throughout the specification. Inside blades are those blades on a cutter which form the inside or convex flank of a tooth while the outside blades are those blades which form the outside or concave flank of a tooth on a workpiece.

FIG. 3a is an axial plane view of a feedpath in a direction along the generating gear axis G The axial plane being defined as containing the workpiece axis W and the theoretical generating gear axis G. The initial position of the workpiece shown by dashed lines is denoted at $12_i$ with the initial workpiece axis position at $W_i$. In this position, the plane 48 of the tips of the tool are initially contacting the workpiece 12. The workpiece 12 i fed in relative to the tool in the direction along the generating gear axis G until a predetermined full depth is reached. At this full depth position, the workpiece, represented by solid lines, is at position $12_f$ with its axis shown by $W_f$.

FIG. 3c represents a pitch plane view of the feedpath along the generating gear axis G. It should be noted here that in the context of the specification, the term "feedpath" is being used to describe the path of the tool relative to the workpiece as the workpiece is fed from an initial contact position with the tool to a final position at a desired or "full" depth. Reference number 50 denotes the tooth slot, $R_c$ is the mean cutter radius, D indicates the design point of the tooth, and the vector N represents the tooth normal vector at the design point D. It should be noted that although the design point D generally coincides with the mean point of the tooth, as is the case here, the design point may be located at any point along the tooth.

With reference to FIG. 3a it is seen that the generating cone distance is smaller at the top of the tooth than at the root. This difference in generating cone distance results in a difference in spiral angle, $\psi_i$, at the top of the tooth when compared to the spiral angle, $\psi_f$, at the bottom of the tooth (FIG. 3c) when viewed along a line perpendicular to the root line of the tooth, for example, along line 60. This change in spiral angle is inherent in the tooth geometry when a tapered generating gear is used.

The inherent change in spiral angle can be described by the following equation:

$$\Delta\psi = \left[ \frac{1}{R_c \cos\psi} - \frac{\tan\psi}{A} \right] \Delta A$$

wherein:
$R_c$ = the cutter radius
A = the mean generating cone distance
$\psi$ = the generating spiral angle
$\Delta A$ = the change in cone distance FIG. 3b represents a view along the theoretical generating gear axis G in the direction of feed. From FIGS. 3a and 3b it is seen that the generating cone distance at the top of the tooth (A—ΔA) and at the root of the tooth (A) are different when viewed along line 60 but are held constant during the plunge. In other words, the cone distance is held constant along lines parallel to the generating gear axis G, for example, line 65, thus resulting in a constant spiral angle along lines such as line 65. The result is correct spiral angles cut throughout the generation.

FIG. 3d represents a view in the normal plane wherein a component of motion along the normal vector N would be included with the feed along the generating gear axis if a cutter having blades with unequal pressure angles were utilized.

FIG. 4 is an enlarged view showing the effect of feeding along the theoretical generating gear axis G. The tooth slot 50 is formed between an outside tooth flank 51 and an inside tooth flank 52 and has a heel end 53 and a toe end 54. The position of the cutter is indicated by the dotted line 55. It can be seen that as the workpiece is fed from its initial position $12_i$ (dashed lines) of just contacting the tool to its final position $12_f$ (solid lines) where the tool is at full depth in the workpiece, the relationship changes between the workpiece and the generating gear axis G. The workpiece moves along the generating gear axis G as it is fed to full depth. The correct spiral angles are held during the feed. However, there is a shifting of the workpiece slot relative to the cutter blades as the workpiece is fed from position $12_i$ to the full depth position $12_f$. The effect is a shifting of the cutting blades from a position nearer the outside flank 51 towards the center of the final tooth slot as the feed progresses. As stated above, a constant spiral angle is held during the plunge along lines on the tooth flank surfaces parallel to the generating gear axis G.

At the initial contact of the workpiece $12_i$, the position 55 of the cutting blades extends between the toe end $12_{i1}$ and heel end $12_{i2}$ at a position higher than the desired center of the tooth slot 50, the blades being closer to the final position of the outside flank 51. However, as feed progresses to the full depth position $12_f$, the position 55 of cutting blades moves into the proper center position of the slot 50, extending from the toe end $12_{f1}$ to the heel end $12_{f2}$. Thus it can be seen that a shift of the cutting blades generally away from the outside flank 51 toward the center of the slot takes place.

The shift of the cutting blades to a centered position at full depth $12_f$ from the direction of the outside flank 51 results in increased cutting forces on the inside cutting blades as well as premature wear of the inside blades.

FIGS. 5a, 5b, 5c and 5d represent views of a workpiece in an axial plane, along the generating gear axis G, in the pitch plane, and in the normal plane, respectively, when the workpiece and the tool are fed relative to one another in a direction along the tool axis T.

FIG. 5a is an axial plane view of a feedpath in a direction along the tool axis, denoted by T. The initial position of the workpiece is denoted by $12_i$ with the initial workpiece axis position at $W_i$. In this position, the plane 48 of the tips of a tool having axis T is initially contacting the workpiece 12. The workpiece 12 is fed in relative to the tool in the direction along the tool axis T until a predetermined full depth is reached. At this point, the workpiece is at position $12_f$ with its axis shown by $W_f$.

It is also seen in FIG. 5b, which shows a view along generating gear axis G, that when the tool axis feedpath of the workpiece 12 relative to the tool is viewed along the generating gear axis G, there is a shifting of the workpiece slot relative to the cutter blades as the workpiece is fed from position $12_i$ to $12_f$. The effect is a shifting of the cutting blades from a position nearer the inside flank 52 toward the center of the final tooth slot as feed progresses. The shift of the cutting blades to a centered position at full depth $12_f$ from the direction of the inside flank 52 result in increased cutting forces on the outside cutting blades as well as premature wear of the outside blades.

In the pitch plane view of FIG. 5c it can be seen that feeding in a direction along the tool axis T does not change the relationship between the workpiece 12 and the generating gear axis G. When the cutter blades first engage the workpiece at position $12_i$, the spiral angle cut is the same as the spiral angle cut at the root of the workpiece when the feed has progressed to position $12_f$. Inherently, as previously mentioned, when cutting with a tapered generating gear, the final spiral angle at the top of the tooth is different from the spiral angle at the root of the tooth. This effect is described in detail above. As feed progresses along the tool axis T the cutting cone distance at the top of the tooth is reduced and the spiral angle at the top of the tooth is decreased.

The change in spiral angle causes the blades to undergo a twisting in a counterclockwise direction during the feeding of the tool into the workpiece. The blades which cut the inside flank 52 move toward the inside flank 52 at the toe end 54 of the slot 50 while the blades which cut the outside flank 51 move toward the outside flank 51 at the heel end 53 of the slot 50. This twisting brings about the desired spiral angle change, but also adds to the stock material in the slot to be removed by the outside blades due to the shifting from the lower than center position of the slot at $12_i$ to the center of the slot at $12_f$. The shifting and twisting of the cutting blades results in excessive loads being placed upon the cutting blades as well as uneven wear of the cutting blades with the outside blades wearing faster due to their removing a greater amount of stock material.

With reference to FIG. 6, the effect of blade shift and twist when feeding takes place along the tool axis T can be more clearly seen. The slot 50 extends between outside flank 51, inside flank 52, heel end 53, and toe end 54. At the initial contact position with the workpiece $12_i$, the position of the cutting blades (indicated by the dotted line 55 which represents the middle of the cutter point width for face milled parts or the average cutter radius for face hobbed parts) extends between the toe end $12_{i1}$ and the heel end $12_{i2}$ at a position lower than the desired center of the tooth slot 50, the blades being very close to the position of inside flank 52 at the heel $12_{i2}$. As feed progresses, the cutting blades eventually move into the correct position at full depth $12_f$. It can be seen that the blade position extending between the full depth toe position $12_{f1}$ and the full depth heel position $12_{f2}$ is at the proper center position of the slot.

FIG. 5d illustrates a view in a normal plane which is defined by the tool axis T and a tooth normal vector N. As was previously discussed, the use of cutting blades having uneven pressure angles usually results in uneven chip loads since one side of the blades removes more stock material than the other side of the blades. In this situation, a component of motion is included in the direction of the normal vector N as the tool is fed along the tool axis T in order to balance chip loading. Since the tool axis T and the normal vector N define the normal plane, motion along the normal vector N still results in the feed direction being confined to the normal plane although at an angle relative to the tool axis T. However, the inclusion of this normal component of motion does not influence the above-noted undesirable effects with regard blade shift and spiral angle change.

In face hobbing processes, the lengthwise curve on a gear tooth is kinematically formed as a function of the generating pitch angle, generating cone distance, number of teeth in the generating gear and number of blade groups on the cutter. The relationship can be expressed as follows:

$$\sin\beta = \frac{A\cos\psi}{R_c} \frac{n_b}{N_G}$$

wherein:
A = mean generating cone distance
$\psi$ = generating spiral angle
$R_c$ = cutter radius
$n_b$ = number of blade groups
$N_G$ = number of teeth in the generating gear
$\beta$ = angle between the cutter radius and tooth normal in the face hobbing process From FIG. 5a it can be seen that the generating cone distance A changes from the top of the tooth to the bottom or root of the tooth when the generating gear is tapered ($\Delta\Gamma$). The amount of cone distance change, $\Delta A$, is shown in FIG. 5a which is a view in the axial plane defined by the generating gear axis G and the work axis W.

In a section perpendicular to the root line of the finished work gear, the spiral angle is less at the top of the tooth than at the root. One reason for the change in spiral angle is due to the face hobbing kinematic curve changes due to the tapered generating gear and the accompanying change in cone distance $\Delta A$ as feed progresses along the tool axis T. This change can be expressed as follows:

$$\Delta\psi_1 = \frac{\cos\psi}{R_c \cos\beta} \frac{n_b}{N_G} \Delta A$$

wherein:
$\Delta A$ = the change in cone distance
$\psi$ = generating spiral angle
$R_c$ = cutter radius
$n_b$ = number of blade groups
$N_G$ = number of teeth in the generating gear
$\beta$ = angle between the cutter radius and tooth normal in the face hobbing process A second reason for the change in spiral angle when feeding along the tool axis T is the inherent change, as discussed above, brought about by the change in generating cone distance. This changing cone distance brings about twisting of the cutter blades as discussed above with reference to FIG. 5b and FIG. 6. The change in spiral angle due to the cone distance change and its accompanying shifting and twisting when the feedpath is along the tool axis T can also be described by the previously stated equation:

$$\Delta\psi_2 = \left[\frac{1}{R_c \cos\psi} - \frac{\tan\psi}{A}\right]\Delta A$$

wherein:
$R_c$ = the cutter radius
A = the mean generating cone distance
$\psi$ = the generating spiral angle $\Delta A$ = the change in cone distance It should be noted that this particular equation also applies to face milling processes wherein feed progresses along the tool axis T.

Therefore, the spiral angle at the top of the tooth, $\Psi_T$, can be expressed as $\Psi_T = \Psi - \Delta\Psi_1 - \Delta\Psi_2$ since $\Delta A$ is negative.

With reference to FIGS. 5a and 5b, when the workpiece is fed relative to the cutter along tool axis T to the point where the blades first contact the workpiece blank $12_i$, the generating cone distance at the midsection $D_i$ is equal the mean cone distance (A) and the spiral angle of the job is cut. However, as the workpiece and cutter are advanced relative to one another, the generating cone distance at the top decreases causing a decrease in spiral angle. The result is the cutter twisting in the tooth slot so as to burden the outside blade at the outside of the slot, and the inside blade at the inside of the slot.

Feeding the tool relative to the workpiece in a direction along either the tool axis or the theoretical generating gear axis brings about undesirable blade shifting. Feeding along the tool axis T results in twisting of the blades and undesirable spiral angle changes as well as accelerated blade wear especially in face hobbing processes. The effects noted with respect to feeding along the tool axis are more pronounced than those observed when the feeding takes place in a direction along the generating gear axis. In either case however, a feedpath is needed wherein the discussed drawbacks associated with either of the prior art feeding methods are minimized or eliminated.

Applicants have now discovered a method of feeding a tool to a predetermined depth relative to a workpiece wherein the problems associated with the prior art feeding techniques have been rectified. FIG. 7a represents an axial plane view illustrating applicants' inventive method. The method comprises feeding the tool relative to the workpiece along a feedpath wherein at least a portion, and preferably all, of the feedpath comprises a feed vector F. The feed vector F has at least a first component, G', in substantially the direction of the theoretical generating gear axis G, and a second component, H, which extends in a direction substantially perpendicular to the generating gear axis G. The first and second feedpath components lie within the axial plane.

The first feed vector component G' is the major component of the feed vector F and is in the direction of the generating gear axis G. The second feed vector component H is perpendicular to the generating gear axis G and it effectively repositions the slot 50 thereby reducing blade shift and twist. The magnitude of the second feed vector component H is dependent upon the geometry of the workpiece being machined and the particular tool utilized.

FIG. 7b illustrates the feed vector F as viewed along the generating gear axis G and FIG. 7c represents the view of the feed vector F in the pitch plane.

The feed vector may also include a third component, N', as shown by FIG. 7d, which may be included such as when unbalanced pressure angle tools re utilized. For clarity, feed vector F, comprising first and second components as shown in FIG. 7a, is shown in FIG. 7d along with the normal component N' which together form feed vector F'.

Figure 8:
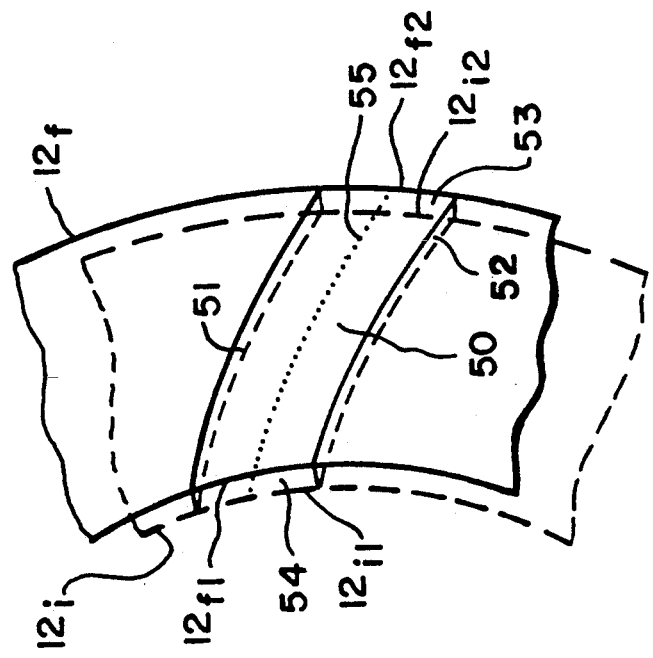
FIG. 8 shows the position change from initial contact to final depth of a tool in a tooth slot with a feedpath according to the present invention.

FIG. 8 is an enlarged view showing the effect of feeding along the inventive feedpath. There is only a minute shift in the path of the cutting blades 55, in a direction from outside flank 51 to the center of the slot 50, as the workpiece is fed from its initial position $12_i$ to its full depth position $12_f$. This slight shift minimizes excess cutting loads on the inside blades and reduces wear thereof.

Figure 9:
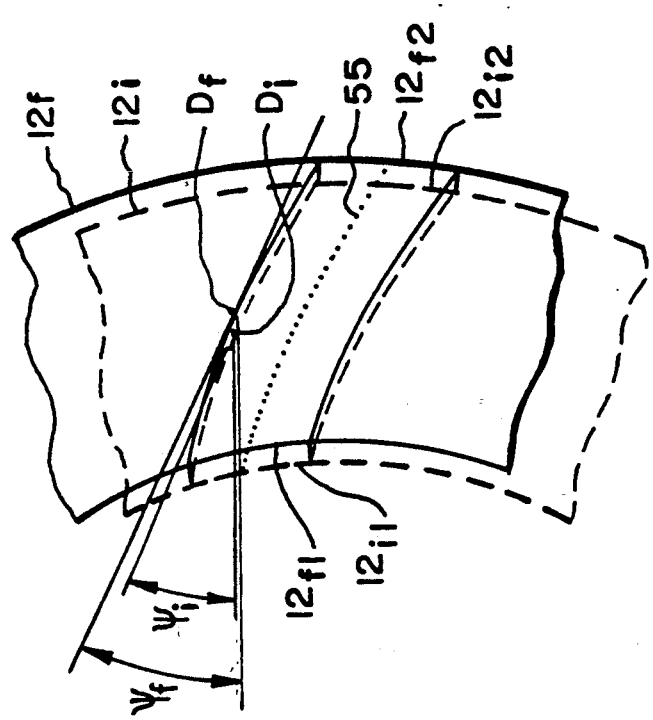
FIG. 9 shows the spiral angles of a tooth surface at initial contact with a tool and at the full depth position of the tool.

With the present inventive method, twisting of the cutting blades in the slot 50 is also significantly reduced as is the spiral angle change. FIG. 9 shows there is little change in the spiral angle $\psi_i$ at the initial contact position $12_i$ and the spiral angle $\psi_f$ at the full depth position $12_f$.

The inventive method comprises providing a tool, preferably a cutter, and workpiece, such as a work gear, each being rotatable about its respective axis of rotation. The workpiece is in mesh with a theoretical generating gear which is rotatable about an axis of rotation. The tool is rotated and then brought into contact with the workpiece. From the point of contact, the tool is fed, relative to the workpiece, along a feedpath to a predetermined depth in the workpiece. At least a portion of the feedpath is defined by a feed vector having at least two feed vector components which lie in an axial plane defined by the workpiece axis and the generating gear axis. The first feed vector component G' extends in the direction of the generating gear axis G and the second feed vector component H extends in a direction perpendicular to the generating gear axis G. The feed vector may further include a third feed vector component N' extending in a normal plane defined by the tool axis T and a tooth normal vector N from the design point of a tooth.

After the desired depth has been reached the tool may be withdrawn and the workpiece indexed to the next tooth slot position if the tooth profile is formed directly from the profile shape of the tool (non-generated).

However, after the desired depth is reached, the process may further include a generating roll. The generating roll comprises relatively rolling the rotating tool and the workpiece along a generating path about the axis of the generating gear as though the workpiece were rolling in mesh with the generating gear. The teeth of the generating gear are represented by the stock removing surfaces of the tool during the generating roll and the final tooth profile shape is generated as a result of the tool and workpiece motion. At the end of the roll, the tool is withdrawn and the workpiece indexed to the next slot position.

Preferably, adjacent tooth surfaces of consecutive teeth are formed by one plunge to the desired full depth position. In other words, a slot between consecutive teeth is formed by each plunge along the feedpath. However, separate processes, and hence feedpaths, may be used to form inside (convex) tooth surfaces and outside (concave) tooth surfaces. In either case, the inventive feedpath is equally applicable.

The present inventive feeding method may also be included in face hobbing processes, especially generating face hobbing processes. These processes include rotating the workpiece in a predetermined timed relationship with the tool prior to contacting with the tool. All tooth surfaces of the workpiece are formed in one plunge to full depth. In generating face hobbing, the plunge is followed by a generating roll.

Regardless of the type of stock removing process, the present inventive feeding method is applicable since, for all types of cutting or grinding processes, the tool must first be fed into the workpiece along a feedpath to a desired depth.

The machine motions necessary for the present invention are carried out in response to instructions input to the computer for such things as machine setup, tool feeding, and generating roll. Initial setup positions are computed and the computer controlled axes are moved to the setup positions. A feedpath of the tool relative to the workpiece is then computed in response to feed parameters such as the X, Y, and Z coordinates. The computer controlled axes are the moved to feed the tool relative to the workpiece along the feedpath at least a portion of which comprises a feed vector as described above. The computer controlled axes may also be moved in a manner wherein a generating roll is carried out and the workpiece may also be rotated in a timed relationship with the tool in order that a face hobbing process may be performed.

The present process enables uneven tool loads to be significantly reduced and tool life to be extended. Reducing uneven tool loads also decreases undesirable vibrations which enhances the quality of the workpiece being machined.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of feeding a tool to a predetermined depth in a workpiece in a machining process for producing at least one tooth surface on said workpiece, said tool being rotatable about a tool axis and having at least one stock removing surface, said workpiece being rotatable about a work axis and being in mesh with a theoretical generating gear, said theoretical generating gear being rotatable about a generating gear axis, said method comprising:

rotating said tool about said tool axis, contacting said rotating tool and said workpiece, feeding said tool relative to said workpiece along a feedpath to said predetermined depth, wherein at least a portion of said feedpath is defined by a feed vector comprising at least first and second feed vector components, said first and second feed vector components being positioned in an axial plane defined by said generating gear axis and said work axis, said first feed vector component being substantially in the direction of said generating gear axis and said second feed vector component being substantially perpendicular to said generating gear axis.

2. The method of claim 1 wherein said feed vector further comprises a third feed vector component, said third feed vector component being in a normal plane, said normal plane being defined by said cutter axis and a tooth normal vector at a design point of said tooth surface.

3. The method of claim 1 further including relatively rolling said rotating cutter and said workpiece along a generating path about said generating gear axis as though said workpiece were rolling in mesh with said theoretical generating gear, said at least one stock removing surface of said tool representing at least one tooth of said theoretical generating gear.

4. The method of claim 3 wherein adjacent tooth surfaces of two consecutive teeth on said workpiece are formed during said rolling motion.

5. The method of claim 3 including rotating said workpiece about said work axis prior to said contacting, said tool and workpiece rotating in a predetermined timed relationship whereby tooth surfaces of all teeth on said workpiece are formed during said rolling motion.

6. The method of claim 1 wherein said feedpath is substantially completely defined by said feed vector.

7. A method of feeding a tool relative to a work gear in a process for forming spiral bevel and hypoid gears with a computer controlled machine, said computer controlled machine comprising a plurality of computer controlled axes for positioning and operatively engaging said tool with said work gear, said tool being arranged for rotation about a tool axis and said work gear being arranged for rotation about a work axis, said work gear being in mesh with a theoretical generating gear rotatable about a generating gear axis, said method comprising the steps of:
 computing initial setup positions in response to setup parameters input to said machine,
 moving said computer controlled axes to initial setup positions for initially positioning said tool and work gear with respect to each other,
 computing a feedpath of said tool relative to said work gear in response to feed parameters input to said machine,
 rotating said tool about said tool axis,
 moving said computer controlled axes to feed said rotating tool relative to said work gear along said feedpath to a predetermined depth in said work gear, at least a portion of said feedpath being defined by a feed vector,
 wherein said feed vector comprises at least first and second feed vector components, said feed vector components being positioned in an axial plane defined by said generating gear axis and said work axis, said first feed vector component being substantially in the direction of said generating gear axis and said second feed vector component being substantially perpendicular to said generating gear axis.

8. The method of claim 7 further comprising:
 computing further operating positions of said axes in response to operating parameters input to said machine,
 moving said computer axes to said further operating positions in a manner to impart a predetermined relative rolling motion between said tool and work gear as though said work gear were rolling in mesh with said theoretical generating gear, the teeth of said theoretical generating gear being represented by the stock removing surfaces of said tool,
 repeating said steps of computing further operating positions and moving said computer controlled axes to said further operating positions for completing said relative rolling motion.

9. The method of claim 8 wherein said process for forming bevel and hypoid gears comprises face milling.

10. The method of claim 8 wherein said process for forming bevel and hypoid gears comprises face hobbing.

11. The method of claim 7 wherein said feedpath is substantially completely defined by said feed vector.

12. A method of feeding a tool to a predetermined depth in a work gear in a face hobbing process for producing bevel and hypoid gears, said tool being rotatable about a tool axis and having a plurality of stock removing surfaces, said work gear being rotatable about a work axis and being in mesh with a theoretical generating gear, said theoretical generating gear being rotatable about a generating gear axis, said method comprising:
 rotating said tool about said tool axis,
 rotating said work gear about said work axis, said tool and work gear rotating in a timed relationship,
 contacting said rotating tool and said rotating workpiece,
 feeding said tool relative to said workpiece along a feedpath to said predetermined depth,
 wherein at least a portion of said feedpath is defined by a feed vector comprising at least first and second feed vector components, said feed vector components being positioned in an axial plane defined by said generating gear axis and said work axis, said first feed vector component being substantially in the direction of said generating gear axis and said second feed vector component being substantially perpendicular to said generating gear axis.

13. The method of claim 12 further including relatively rolling said cutter and said work gear about said generating gear axis as though said workpiece were rolling in mesh with said theoretical generating gear, said theoretical generating gear having tooth surfaces represented by said stock removing surfaces of said tool.

14. The method of claim 12 wherein said feedpath is substantially completely defined by said feed vector.

15. The method of claim 12 wherein said face hobbing process is a generating face hobbing process.

* * * * *

UNITED STATES PATENT OFFICE
CERTIFICATE OF CORRECTION

PATENT NO. : 5,310,295
DATED : May 10, 1994
INVENTOR(S) : Donald W. Palmateer, Jr., Mark J. Boch, and, Theodore J. Krenzer It is certified that error appears in the above-identified patent and that said Letters Patent is hereby corrected as shown below:

On title page, item [75] the name of the second inventor "Mark J. Bogh" is misspelled, the correct spelling is as follows: -- Mark J. Boch --.

Column 5, line 61, "patch" should be deleted and -- pitch -- inserted therefor.

Column 6, line 22, "i" should be deleted and -- is -- inserted therefor.

Signed and Sealed this

Sixteenth Day of August, 1994

Attest:

BRUCE LEHMAN

*Attesting Officer*  *Commissioner of Patents and Trademarks*